United States Patent [19]

Mifune et al.

[11] 3,846,551

[45] Nov. 5, 1974

[54] INSECTICIDAL AND ACARICIDAL COMPOSITION AND PROCESS FOR CONTROLLING PESTS

[75] Inventors: Akira Mifune, Tokyo; Yoshio Katsuda, Nishinomiya; Toyoaki Yoneda, Tokyo, all of Japan

[73] Assignees: Teijin Limited; Dai Nihon Jochugiku Co. Ltd., both of Osaka, Japan

[22] Filed: Nov. 16, 1973

[21] Appl. No.: 416,666

[30] Foreign Application Priority Data
Nov. 20, 1972 Japan.............................. 47-115678

[52] U.S. Cl. ............................................... 424/180
[51] Int. Cl. ......................... A01n 9/00, A01n 9/28

[58] Field of Search .................................... 424/180

[56] References Cited
UNITED STATES PATENTS

| 3,005,750 | 10/1961 | Fluck | 424/180 |
| 3,535,423 | 10/1970 | Ordas | 424/176 |

Primary Examiner—Elbert L. Roberts
Attorney, Agent, or Firm—Sherman & Shalloway

[57] ABSTRACT

An insecticidal and acaricidal composition comprising a pesticidal amount of an interacted compound of a pyrethroid with a cyclodextrin and a diluent or carrier, and a process for controlling pests using said composition.

5 Claims, No Drawings

INSECTICIDAL AND ACARICIDAL COMPOSITION AND PROCESS FOR CONTROLLING PESTS

This invention relates to an insecticidal and acaricidal composition containing as an active ingredient an interacted compound (or molecular compound) of a pyrethroid with a cyclodextrin which contributes to the improvement of the stability of the pyrethroids to heat and light and exhibits insecticidal and acaricidal effects; and to a process for controlling pests.

Pyrethroids have been widely utilized because of their superior pesticidal effect and having substantially no toxicity or very low toxicity to man and other warm-blooded animals, but on the other hand, have the defect of poor stability to heat and light, which poses a serious problem in storage for prolonged periods of time.

As a result of extensive investigations with a view to remedying this defect, we have found that an interacted compound of a pyrethroid with a cyclodextrin can be formed; this interacted compound not known heretofore exhibits superior stability to heat and light; and that it can be stored for prolonged periods of time and even when used as a fumigant, exhibits strong pesticidal activity with difficulty of decomposition by heat.

Furthermore, it has been found that the above interacted compound, which is presumed to contain an inclusion compound consisting of the pyrethroid as a guest compound and the cyclodextrin as a host crystal, has an improved pesticidal effect, such as rapid effectiveness, as compared with the pyrethroid alone as an active ingredient.

Accordingly, it is an object of this invention to provide an insecticidal and acaricidal composition having improved stability and pesticidal effects.

Another object of this invention is to provide a process for controlling pests using the above interacted compound.

Many other objects of this invention along with its advantages will become more apparent from the following description.

The pyrethroids themselves to be used for forming the active ingredient of the composition of this invention are known. Examples are pesticidal component pyrethrins of a natural source which are contained in pyrethrum obtained for example, by drying the flower of Chrysanthemum cinerariaefolium, or synthetic pesticidal component Mimics. They are known to be esters of chrysanthemic acid or esters of chrysanthemum dicarboxylic acid. Specific examples of these natural and synthetic pyrethroids are:

1. Pyrethrins (natural):

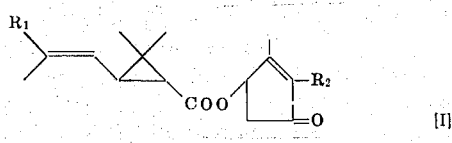

$$\begin{bmatrix} R_1 = \text{methyl or methoxycarbonyl} \\ R_2 = \text{pent-2,4-dienyl, 2-butenyl or} \\ \text{2-pentenyl} \end{bmatrix}$$

2. Mimics (synthetics):

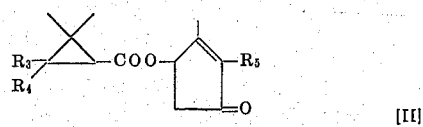

$$\begin{bmatrix} R_3 = \text{methyl or iso-butenyl} \\ R_4 = \text{hydrogen or methyl} \\ R_5 = \text{allyl or propargyl} \end{bmatrix}$$

A compound of formula [II] wherein $R_3$ is isobutenyl, $R_4$ is hydrogen, and $R_5$ is allyl is well known as Allethrin.

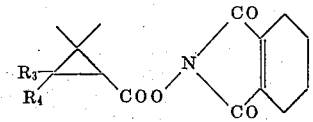

[wherein $R_3$ and $R_4$ are the same as defined in formula [II]]

A compound of formula [III] wherein $R_3$ is isobutenyl and $R_4$ is hydrogen is well known as Tetramethrin.

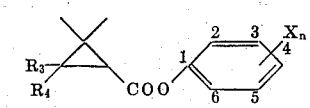

[wherein $R_3$ and $R_4$ are the same as defined in formula [II], X is methyl, allyl, propargyl, benzyl or phenoxy, and $n$ is 1 to 3, with the proviso that when $n$ is 2, at least one X is methyl, and when n is 3, at least two X's are methyl]

Compounds of formula [IV] wherein $R_3$, $R_4$ and X respectively represent isobutenyl, hydrogen and 2,4-dimethyl ($n=2$), isobutenyl, hydrogen and 5-phenoxy ($n=1$), and isobutenyl, hydrogen and 4-allyl ($n=1$) are called respectively as Dimethrin, Phenothrin and Benathrin.

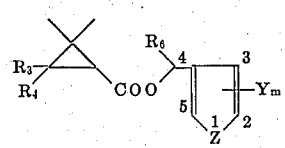

[wherein $R_3$ and $R_4$ are the same as defined in formula [II], Z is —S— or —O—, $R_6$ is hydrogen, methyl or $C_{2-3}$ alkyl, alkenyl, or alkynyl, Y is methyl, allyl, propargyl or benzyl, and m is 1 or 2, with the proviso that when m is 2, at least one Y is methyl]

Compounds of the formula [V] wherein Z is —O—, and $R_3$, $R_4$, $R_6$ and Y are isobutenyl, hydrogen, hydrogen and 2-benzyl (m=1) respectively, and isobutenyl, hydrogen, hydrogen and (2-propargyl, 5-methyl(m=2)respectively, are well known respectively as Resmethrin and Proparthrin.

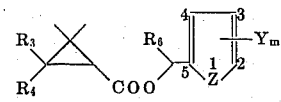

[wherein $R_3$, $R_4$, $R_6$, Y, Z and m are the same as defined in formulae [II] and [V]]

Compounds of the formula [VI] wherein Z is —O—, and $R_3$, $R_4$, $R_6$ and Y are isobutenyl, hydrogen, hydrogen and 2-allyl ($m=1$) respectively, and isobutenyl, hydrogen, hydrogen and 2-propargyl, ($m=2$) respectively are well known respectively as Japothrin and Furamethrin.

Other well known pyrethroids are

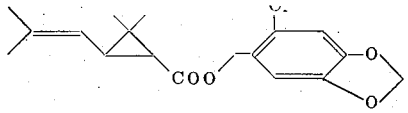
Barthrin

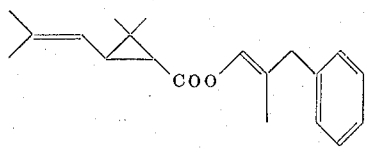
Butethrin

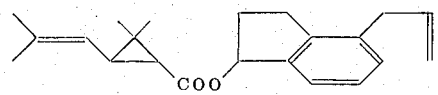
4-allylindane-1-yl-chrysanthemate

The cyclodextrin itself to be used for preparing the active component in the present invention is also known and often called cycloamylose or Schardinger dextrin. The cyclodextrin is a substance usually used, for example, as a filler in a gas chromatographic column, or a carrier of medicines. It has a structure wherein the glucose units are cyclically bonded, and usually consists of about 6 to 8 glucose units. The method for its preparation is also well known, and for example, it can be prepared by the method disclosed in "Die Stärke" 15, Nr. 8, page 281 (1963), which involves causing cyclodextrin glycosyltransferase to act on starch or a hydrolyzed product of starch thereby to decompose and cleave the helical structure of the starch and to bond the cut ends. Furthermore, the cyclodextrin can be prepared by the method disclosed in Japanese Patent Publication No. 2380/71 which comprises causing amylase of Bacillus macerans to act on starch which has been lightly liquefied to a DE of not more than 15. The cyclodextrins available are, for example, $\alpha$-cyclodextrin (cyclohexamylose), $\beta$-cyclodextrin (cycloheptamylose), and $\gamma$-cyclodextrin (cyclooctamylose). Usually, they are obtained as a mixture of these, and can be separated and purified by, for example, fractional precipitation. In the present invention, they can be used either as a mixture or as separated individual compounds.

The interacted compound of a pyrethroid with a cyclodextrin used an an active ingredient of the composition of this invention can be prepared by contacting at least one pyrethroid intimately with at least one cyclodextrin in the presence of water. The water may be adhered or added water which the pyrethroid and/or cyclodextrin can contain, but usually further water is added.

For example, it can be prepared by sufficiently kneading 10 to 20 parts by weight of a pyrethroid, 90 to 150 parts by weight of a cyclodextrin, and 30 to 60 parts by weight of water in a kneader (further adding a small amount of water if desired, when the viscosity of the mixture increases), pouring the kneaded mixture into five times its volume of water, and separating the precipitate by filtration and drying it to form a powdery product. The suitable temperature for kneading is about 5° to about 70°C., preferably about 15° to 30°C. Usually, the kneading is carried out for about 30 minutes to about 4 hours. Alternatively, a pyrethroid is added to an aqueous solution of a cyclodextrin, and the mixture is stirred for 30 minutes to 4 hours. Then, the stirred mixture is allowed to stand for 3 to 6 hours, followed by filtration and drying. The stirring temperature is about 5° to 70°C., preferably about 30° to about 50°C. The preferred temperature at the time of standing is room temperature or higher.

The interacted compound used as an active ingredient of the composition of the present invention has properties clearly different from those of a mere mixture of the pyrethroid and the cyclodextrin, and the inventors presume that it is an inclusion compound consisting of the pyrethroid as a guest compound and the cyclodextrin as a host crystal. The proportion of the pyrethroid to the cyclodextrin in the resulting interacted compound may vary over a range of 0.5 to 1.5 mols per mol of the cyclodextrin.

When an interacted compound consisting of 1 mol of allethrin as the pyrethroid per mol of the cyclodextrin is washed with cold water, no pyrethroid is washed out, but when said interacted compound is extracted with diethyl either for 24 hours using a Soxhlet extractor, 0.5 mol of pyrethroid remains in the interacted compound per mol of the cyclodextrin, and the pyrethroid cannot be extracted further. It has not yet been clarified in what form 0.5 mol of the extracted pyrethroid is included, connected, or merely adhered in the rings and/or among the rings of the cyclodextrin. However, in view of the fact that when a mere mixture of the pyrethroid and the cyclodextrin is extracted similarly, substantially all of the pyrethroid is extracted, it is evident that some interaction occurs between the two compounds in the active ingredient used in this invention. Furthermore, in view of the fact that the cyclodextrin is known to form an inclusion compound with, for example, menthyl acetate, we presume that probably an inclusion compound consisting of the cyclodextrin as a host crystal and the pyrethroid as a guest compound is formed.

Stability to ultraviolet rays was tested using an ultraviolet ray lamp (254 m$\mu$) as an irradiation source on interacted compounds of this invention in which allethrin is present in a proportion of 0.5 mol per mol of cyclodextrin and in a proportion of 1.0 mol per mol of cyclodextrin, a mere mixture of 1 mol of cyclodextrin and 0.5 mol of allethrin (Control No. 1), and a mere mixture of 1 mol of starch and 0.5 mol of allethrin (Control No. 2). The results are shown in the following table 1. In the table, CD stands for cyclodextrin, and Alle stands for allethrin. The numerical values show the amounts of residue. The numerical values in the parentheses are the rate of residue in percent with the value at the start being 100 percent.

Table 1

| Sample | | Irradiation time | | | |
| --- | --- | --- | --- | --- | --- |
| | | Start | 1 weeks | 2 weeks | 3 weeks |
| This invention | CD-Alle (1:0.5) interacted compound | 10.90% (100) | 10.06% (92.3) | 8.15% (74.8) | 6.78% (62.2) |
| | CD-Alle (1:1) interacted compound | 16.65% (100) | 12.55% (75.5) | 10.00% (60.0) | 8.42% (50.5) |
| Control No. 1 | CD-Alle mixture | 7.80 (100) | 2.28 (29.2) | 0 (0) | 0 (0) |
| Control No. 2 | Starch-Alle mixture | 8.45 (100) | 3.82 (45.2) | 0.8 (9.5) | 0 (0) |

The irradiation source : an ultraviolet ray lamp (254mμ)

It is also seen from the results of Table 1 that interaction occurs between the cyclodextrin and the pyrethroid in the active ingredient used in the present invention, to increase stability to ultraviolet rays, and the active ingredient used in this invention differs from a mere mixture of these two compounds. The results of the ultraviolet ray stability test and the extraction test show that the active ingredient used in this invention differs from the mere mixture, but is presumed to be the inclusion compound mentioned above.

Since, as stated above, the active ingredient used in this invention can be formed by contacting at least one pyrethroid intimately with at least one cyclodextrin in the presence of water, it will be readily understood that depending upon the formulation, the interacted product can be formed at the time of preparing the final pesticidal composition instead of preparing the interacted product in advance and then blending it with a diluent or carrier. For instance, in the case of a wettable powder, the interacted product can be formed during its preparation.

The insecticidal and acaricidal composition of this invention may be in various formulations, such as a liquid, emulsifiable concentrate, wettable powder, oil, aerosol, paste, fumigant, dust, granule, tablet, or pellet.

The insecticidal and acaricidal composition of this invention contains various gaseous, liquid or solid diluents or carriers, and if desired, may be further contain various assistants, such as a surface active agent, emulsifier, dispersing agent, spreader, sticker, synergist, antioxidant, ultraviolet absorbent, and other insecticide.

The gaseous diluent or carrier may, for example, be a normally gaseous diffusing agent for use in preparing aerosols. Examples of the liquid diluent or carrier are aromatic hydrocarbons such as benzene, toluene or xylene, chlorinated aromatic or aliphatic hydrocarbons such as chlorobenzene, dichlorobenzene, methylene chloride, dichloroethane, trichloroethylene, trifluoroethylene, or benzyl chloride, aliphatic hydrocarbons such as pentane, hexane, heptane, octane or cyclohexane, alcohols such as methanol, ethanol, propanol, or butanol, keytones such as acetone, methyl ethyl ketone, or cyclohexanone, and water. Examples of the solid diluent or carrier include mineral powders such as diatomaceous earth, talc, clay, attapulgite, bentonite, montmorillonite, kaolin or chalk, and organic powders such as pyrethrum powder, starch, wood powder, leaf powder, microcrystalline cellulose, sugar, dextrose, dextrin, or charcoal powder.

Examples of the surface active agent or emulsifier are anionic surfactants such as a sodium alkylbenzenesulfonate, sodium stearate, sodium lauryl sulfate, a butylamine salt of dodecylbenzenesulfonic acid, an alkylphenolsulfonic acid salt, or a ligninsulfonic acid salt, and nonionic surfactants such as an ester of tall oil, polyoxyethylene nonylphenylether, a polyoxyethylene fatty acid ester, a polyoxyethylene alkylaryl ether, or a polyoxyethylene ether of a polyhydric alcohol.

Examples of the dispersing agents are an alkylcellulose lignin sulfite spent liquor, sodium dioctylsulfosuccinate, sodium dibutylphenylphenol disulfonate, sodium dodecylbenzene sulfonate, sodium lauryl sulfate, polyethylene glycol oleate, a tall oil ester of polyethylene glycol, and p-isooctylphenol decaethylene glycol ether.

Examples of the synergist are piperonyl butoxide, octachlorodipropyl ether, N-(2-ethylhexyl)-bicyclo[2,2,1]- hepta-5-ene-2,3-dicarboxiimide, N-octylsulfoxide of isosafrole, isobornyl thiocyanoacetate, and β-butoxy-β'-thiocyano diethyl ether. isobornyl may be cited as another insecticide. type The insecticidal and acaricidal composition of this invention contains a pesticidal amount of the interacted compound of a pyrethroid with a cyclodextrin in an amount of, for example, 0.5to 100 percent by weight. The content of this active ingredient varies depending upon, for example, the formulation, the method of application, the type of the pest, and time and place of application.

The composition of this invention can be applied to pests and/or their habitat by various means such as spraying, atomizing, misting, dust spraying, fumigating, or irrigation.

The amount of the interacted compound in the ready-to-use preparation can be varied over a wide range according to the formulation. Generally, it is about 0.01 to 50 percent by weight.

The insecticidal and acaricidal composition of this invention is useful for controlling various pests such as sucking insects, biting insects, nematodes, other plant pests, sanitary pests, grain pests, agricultural pests, and forest pests. Thus, the term "insecticidal and acaricidal composition" denotes a composition which is effective for controlling not only insects and acari but also nematodes. Specifically, the composition of this invention is useful for controlling coleopterous, lepidopterous, hemipterous, orthopterous, isopterous and dipterous insects, and also acari and nematodes. These pests include not only imagoes, but also the larvae, pupae, and eggs thereof. Specific examples of these pests include flies, mosquitoes, cockroaches, fleas, louse, bedbugs, acari (Ornithonyssus bacoti, Dermanyssus gallinae, Ornithonyssus sylviarum or Acaridia), rice weevils, rust-red flour beetles, planthoppers, leafhoppers (green rice leaf-hoppers, for example), thrips, common cabbage-worm, aphides, lace bugs, pine caterpillars, ants, clothes moths, silver fish, mulberry small weevils, tea tussock moths, tea cochlides, smaller tea tortrizes, tea tortixes, green broad-winged planthoppers, rice leaf beetles, and rice-plant skippers.

As previously stated, the interacted compound of a pyrethroid with a cyclodextrin is not a mere mixture of the pyrethroid and the cyclodextrin, and this was demonstrated by the test involving extractions with ether. In addition to this, the results of a supporting example based on thin-laayer chromatography are shown below.

An interacted compound of allethrin with $\beta$-cyclodextrin (the molar ratio of the allethrin to the $\beta$-cyclodextrin being 1 : 2) was subjected to thin-layer chromatography [solvent: acetone/water=6/4, plate: Microcrystalline Cellulose (Eastmann Co,) 5 × 10 cm, color: $I_2$ vapor], and its $R_f$ value and the number of spots were measured. The results are shown in the following table. As controls, allethrin, $\beta$-cyclodextrin, and a mixture of allethrin and $\beta$-cyclodextrin were used respectively.

| Tested compounds | Number spots | $R_f$ value |
|---|---|---|
| Interacted compound of allethrin with $\beta$-cyclodextrin | 1 | 0.43 – 0.65 (yellow) |
| Mere mixture of allethrin with $\beta$-cyclodextrin | 2 | 0.43 – 0.65 (yellow) 0.97 – 1.00 (brown) |
| Allethrin | 1 | 0.85 – 1.00 (brown) |
| $\beta$-Cyclodextrin | 1 | 0.42 – 0.65 (yellow) |

It is seen from the above results that the interacted compound of allethrin with $\beta$-cyclodextrin does not separate into two spots as in the case with the mere mixture of allethrin with $\beta$-cyclodextrin, but behaves as a single compound, and that its $R_f$ value is almost identical with that of $\beta$-cyclodextrin.

The results of the same tests conducted on some interacted compounds of a pyrethroid with $\beta$-cyclodextrin are shown in the following table.

In the above table under the headline "Compounds tested," the term "interacted compounds" denotes an interacted compound of a pyrethroid with $\beta$-cyclodextrin, and the term "mixture," a mere mixture of a pyrethroid with $\beta$-cyclodextrin. The infrared spectra of the interacted compounds which occupy the spots on the thin-layer chromatogram are almost identical with those of the pyrethroid and $\beta$-cyclodextrin superposed on each other, and also correspond with those of the mere mixtures.

The following Examples illustrate the present invention in greater detail.

FORMULATION EXAMPLE 1

96g of diatomaceous earth was added to 4g of an interacted compound of resmethrin and $\beta$-cyclodextrin (25 percent by weight as resmethrin), and they were throughly stirred and mixed in a kneader to form dusts.

FORMULATION EXAMPLE 2

30 percent by weight of an interacted compound of tetramethrin and $\beta$-cyclodextrin (20 percent by weight as tetramethrin) was well mixed with 10 parts of butyl amine salt of dodecylbenzene sulfonic acid and 60 parts by weight of 300-mesh talc was added. They were mixed well in a kneader with stirring to form a wettable powder.

FORMULATION EXAMPLE 3

2g of an interacted compound of allethrin and $\beta$-cyclodextrin (25 percent by weight as allethrin), 1.5g of a synergist MGK–5026 (trademark for a mixture of N-octyl-bicycloheptenedicarboximide and an isopropylamine salt of dodecylbenzenesulfonic acid), and 96.5g of a mosquito coil base consisting of pyrethrum extracted dust, wood dust and starch were uniformly mixed and formed into a mosquito coil by a conventional method.

| Pyrethroids | Compounds tested | Number of spots | $R_f$ values |
|---|---|---|---|
| Resmethrin | $\beta$-cyclodextrin | 1 | 0.42 – 0.69 (yellow) |
| | Interacted compound | 1 | 0.41 – 0.65 (yellow) |
| | Mixture | 2 | 0.51 – 0.64 (yellow) 0.71 – 0.90 (brown) |
| | Resmethrin | 1 | 0.69 – 0.89 (brown) |
| Furamethrin | $\beta$Cyclodextrin | 1 | 0.37 – 0.60 (yellow) |
| | Interacted compound | 1 | 0.36 – 0.60 (yellow) |
| | Mixture | 2 | 0.42 – 0.61 (yellow) 0.91 – 0.99 (brown) |
| | Furamethrin | 1 | 0.86 – 0.98 (brown) |
| Tetramethrin | $\beta$-cyclodextrin | 1 | 0.41 – 0.63 (yellow) |
| | Interacted compound | 1 | 0.46 – 0.63 (yellow) |
| | Mixture | 2 | 0.43 – 0.61 (yellow) 0.92 – 1.00 (brown) |
| | tetramethrin | 1 | 0.87 – 1.00 (brown) |
| Proparthrin | $\beta$-cyclodextrin | 1 | 0.31 – 0.65 (yellow) |
| | Interacted compound | 1 | 0.33 – 0.62 (yellow) |
| | Mixture | 2 | 0.31 – 0.64 (yellow) 0.94 – 1.00 (brown) |
| | Proparthrin | 1 | 0.87 – 1.00 (brown) |
| 5-Propargyl-$\alpha$-ethynyl-2-furylmethyl-chrysanthemate | $\beta$cyclodextrin | 1 | 0.41 – 0.64 (yellow) |
| | Interacted compound | 1 | 0.37 – 0.59 (yellow) |
| | Mixture | 2 | 0.37 – 0.58 (yellow) 0.93 – 1.00 (brown) |
| | 5-propargyl-$\alpha$-ethynyl-2-furyl-methyl-chrysanthemate | 1 | 0.92 – 1.00 (brown) |

FORMULATION EXAMPLE 4

2g of an interacted compound of furnamethrin and β-cyclodextrin (20 percent by weight as furamethrin), 0.5g of 2,6-bis-t-butyl-4-methylphenol (anti-oxidant), and 97.5g of a mosquito coil base were uniformly mixed and formed into a mosquito coil by a conventional method.

FORMULATION EXAMPLE 5

70 parts by weight of 300-mesh diatomaceous earth was added to 30 parts by weight of an interacted compound of pyrethrin (pyrethrum extract powder) and β-cyclodextrin (1 percent by weight as pyrethrum extract powder), and they were thoroughly mixed and stirred in a kneader to form a dust.

FORMULATION EXAMPLE 6

5g of an interacted compound of proparthrin and β-cyclodextrin (20 percent by weight as proparthrin) was well mixed with 5g of white petrolactum. 30 ml. of water was added to the mixture, and they were well kneaded to form a paste-like insecticide.

About 5g of this insecticide was placed on a heater heated at 120° – 150°C. to volatilize the proparthrin, and the resulting paste-like insecticide was used as an electric mosquito coil.

FORMULATION EXAMPLE 7

4g of an interacted compound of furamethrin and β-cyclodextrin (20 percent by weight as furamethrin), 1.5g of piperonyl butoxide (synergist), 6g of stearic acid, 4.5g of Span 60 (nonionic surfactant) and 2.5g of Tween 60 (nonionic surfactant) were well mixed, and 31.5g of water was added to the mixture. They were well kneaded to form a paste.

About 5g of this paste was placed on a heater held at 120° to 150°C. to volatilize the furamethrin, and the resulting product was used as an electrical mosquito coil.

FORMULATION EXAMPLE 8

4g of an interacted compound of proparthrin and α-cyclodextrin (15 percent by weight as proparthrin) and 1g of a mixture of N-ectylbicycloheptenedicarboximide and an isopropyl amine salt of dodecylbenzenesulfonic acid (trademark, MGK–5026) were uniformly mixed with 95g of a mosquito coil base, and the mixture was made into a mosquito coil by a conventional method.

FORMULATION EXAMPLE 9

98g of diatomaceous earth was added to 2g of an interacted compound of rethmethrin (15 percent by weight as proparthrin), and they were well stirred and mixed in a kneader to form a dust.

FORMULATION EXAMPLE 10

Seven interacted compounds were prepared from tetramethrin, dimethrin, phenothrin, butethrin, 4-allylindane-1-yl-chrysanthemate, benathrin and α-allyl-5-propargyl-3-furylmethyl-chrysanthemate using β-cyclodextrin as a host crystal, and a dust containing each of these compounds as an active ingredient was prepared.

FORMULATION EXAMPLE 11

Three interacted compounds (25 percent by weight as pyrethroid) were prepared from allethrin, japothrin, and 5-propargyl-α-ehtynyl-2-furyl-methyl chrysanthemate using β-cyclodextrin as a host crystal, and a mosquito coil was prepared from 2g of each of these compounds and 98g of a mosquito coil base.

FORMULATION EXAMPLE 12

80g of an interacted compound of tetramethrin and γ-cyclodextrin (15 percent by weight as tetramethrin), 51 g of sodium ligninsulfonate, 5g of a butylamine salt of dodecylbenzenesulfonic acid, and 10g of clay were sufficiently stirred and mixed to form a wettable powder.

FORMULATION EXAMPLE 13

90g of an interacted compound of phenothrin and γ-cyclodextrin and 10g of p-isooctylphenoldecaethylene glycol ether were well stirred and mixed by a kneader to form a wettable powder.

PEST CONTROL EXAMPLE 1

Using interacted compounds of various pyrethroids indicated in Table 3 below and cyclodextrin, mosquito coils containing 0.5 percent by weight of pyrethroids were prepared in accordance with Formulation Examples 3, 4 and 8. Using these mosquito coils, a test was conducted to knock down imagoes of house mosquitoes. The test procedure was one disclosed at page 176 of Vol. 16 of the Japanese-language publication "Bochu-Kagaku" (or Pest Control Science), 1951, page 176 and suggested by Nagasawa and Katsude. The relative effectiveness of the above mosquito coils were calculated. The results are shown in Table 3.

Table 3

| Pyrethroid Compound | 16% knock down | 50% knock down | 84% knock down |
| --- | --- | --- | --- |
| Allethrin | 1.09 (1.00) | 1.12 (1.00) | 1.13 (1.00) |
| Pyrethrin | 1.18 (1.09) | 1.22 (1.14) | 1.25 (1.18) |
| Furamethrin | 2.46 (2.29) | 2.51 (2.35) | 2.58 (2.40) |
| Proparthrin | 2.23 (2.10) | 2.27 (2.14) | 2.31 (2.20) |

The numbers in the table show the relative effectiveness of the interacted compounds, and those in the parentheses show the relative effectiveness of the pyrethroid alone.

EXAMPLE 2

Dusts containing 1 percent by weight of a pyrethroid as an effective ingredient were prepared in the same manner as in Formulation Examples 1 and 5 using various interacted compounds shown in Table 4. The resulting dusts were sprayed on a plywood at a rate of 8 g/m$^2$, and German cockroaches were brought into contact with the dusts for 5 minutes. The time required for 50 percent knockdown and the rate of dead cockroaches after a lapse of 24 hours were measured. The results are shown in Table 4.

Table 4

| Pyrethroid | Time required for 50% knockdown | Rate of dead cockroaches after 24 hours (%) |
|---|---|---|
| Rethmethrin | 4 minutes 20 seconds | 80 |
| Rethemethrin-cyclodextrin interacted compound | 3 minutes | 100 |
| Pyrethrin | 4 minutes 10 seconds | 80 |
| Pyrethrin-cyclodextrin interacted compound | 3 minutes 50 seconds | 90 |

It is surprising to note from the above results of experiment that the insecticidal effect is superior when the interacted compound containing pyrethroid is used than when the pyrethroid is used alone.

Decomposition Test:-

Interacted compounds of various pyrethroids and cyclodextrin (molar ratio of the cyclodextrin to the pyrethroid being 2 : 1) and pyrethroids alone were exposed to the irradiation of ultraviolet rays for 60 hours, and respectively by gas-chromatographic analysis, the amount of the pyrethroid decomposed was measured. The rate of decomposition was measured from the amount of decomposition determined. The results are shown in Table 5.

Table 5

| Pyrethroid | Rate of Decomposition (%) | |
|---|---|---|
| | Pyrethroid alone | Interacted compound |
| Allethrin | 17.5 | 2.0 |
| Tetramethrin | 8.8 | 0.9 |
| Rethmethrin | 14.7 | 1.8 |
| Furamethrin | 24.3 | 2.9 |
| Proparthrin | 30.5 | 3.4 |

It is seen from the results obtained that pyrethroids which are weak in resistance to ultraviolet rays have gained stability to ultraviolet rays by about tenfold.

PEST CONTROL EXAMPLE 3

The same insecticidal test as in Pest Control Example 1 using the seven mosquito coils prepared in Formulation Example 11 and in accordance with Formulation Example 11. The results are shown in Table 6.

Table 6

| Pyrethroid compound | 16% knockdown | 50% knockdown | 84% knockdown |
|---|---|---|---|
| Allethrin | 1.06 (1.00) | 1.10 (1.00) | 1.14 (1.00) |
| Japothrin | 1.23 (1.15) | 1.27 (1.19) | 1.30 (1.21) |
| 5-propargyl-α-ethynyl-2-furylmethyl chrysanthemate | 1.89 (1.70) | 1.95 (1.76) | 2.03 (1.84) |
| 2-methylcyclopenta-2-ene-4-one-1-yl 2,2,3,3-tetramethyl-cyclopropane carboxylate | 1.65 (1.54) | 1.69 (1.57) | 1.72 (1.60) |
| 2,6-dimethyl-4-allyl-benzyl 2,2,3-trimethyl-cyclopropane carboxylate | 1.30 (1.21) | 1.38 (1.25) | 1.43 (1.27) |
| 4-propargylbenzyl 2,2,3,3-tetramethyl-cyclopropane carboxylate | 1.41 (1.30) | 1.47 (1.35) | 1.52 (1.39) |
| α-methyl-5-propargyl-2-furylmethyl 2,2,3-trimethylcyclopropane carboxylate | 1.80 (1.68) | 1.87 (1.71) | 1.91 (1.75) |

The figures in the parentheses show the relative effectiveness of the pyrethroids used alone.

PEST CONTROL EXAMPLE 4

The effects of the seven dusts prepared in Formulation Example 10 against houseflies and acaridia were tested. 100 mg of each of the dusts was spread uniformly on a filter paper placed in a Petri dish having an inside diameter of 9 cm and a height of 6 cm. Ten each of female and male houseflies and 10 acaridias were let free so to be in contact with the dust spread for 60 minutes. The number of the dead after a lapse of 24 hours was observed. The test was conducted indoors, and the temperature of the room at the time was 24 to 28°C. The results are shown in Table 7.

Table 7

| Pyrethroid compounds | Rate of dead houseflies (%) | Rate of dead acaridias (%) |
|---|---|---|
| Tetramethrin | 100 (85) | 100 (90) |
| Dimethrin | 70 (50) | 80 (60) |
| Phenothrin | 90 (80) | 100 (90) |
| 4-allylindane-1-yl-chrysanthemate | 70 (55) | 60 (45) |
| Butethrin | 60 (50) | 75 (60) |
| Benathrin | 85 (70) | 95 (80) |
| α-allyl-5-propargyl-3-furylmethyl chrysanthemate | 95 (85) | 100 (80) |

The figures given in the parentheses show the rate of dead pests when the pyrethroid alone was applied.

PEST CONTROL EXAMPLE 5

Each of the wettable powders of Formulation Example 2 and Formulation Example 13 were applied to Chinese cabbages grown in pots on which 4th-instar larvae of white butterflies lived. The results are shown in Table 8.

Table 8

| Test chemicals | Diluted to | Amount of the effective ingredient | Rate of dead larvae after 24 hours (%) |
|---|---|---|---|
| Tetramethrin wettable powder (Formulation Example 2) | 200 times | 0.03 | 90 (78) |
| Phenothrin wettable powder (Formulation Example 13) | 600 times | 0.03 | 95 (85) |

The figures in the parentheses show the rate of dead larvae when the pyrethroid alone was applied.

PEST CONTROL EXAMPLE 6

A stomach poison test on houseflies was performed using an interacted compound of bio-allethrin and $\beta$-cyclodextrin (the molar ratio of the bio-allethrin to the $\beta$-cyclodextrin being 1 : 2).

Twenty houseflies (male and female) of the Takatsuki strain after four days from emergence were used in each of the following four kinds of test.

a. 90 mg of sugar powder and absorbent cotton impregnated with about 2 ml. of water were used.
b. 90 mg of a mixture of sugar powder and $\beta$-cyclodextrin in a weight ratio of about 1:1, and about 2 ml. of water impregnated with water were used.
c. 90 mg of an interacted compound and bioallethrin and $\beta$-cyclodextrin were used.
d. 90 mg of a mixture of the above interacted compound and sugar in a weight ratio of about 1:1, and absorbent cotton impregnated with about 2 ml. of water were used.

In each case, observation was made after 40 minutes 80 minutes, 210 minutes, and 1280 minutes. The results (the number of dead houseflies) are shown in Table 9.

Table 9

| Case | Time that elapsed 40 minutes | 80 minutes | 210 minutes | 1280 minutes |
|---|---|---|---|---|
| (a) | 1 | 1 | 1 | 1 |
| (b) | 1 | 1 | 1 | 1 |
| (c) | 15 | 20 | 19 | 20 |
| (d) | 12 | 16 | 19 | 20 |

It is seen from the results obtained that cyclodextrin does not show stomach poison, and bio-allethrin exhibits good stomach poison even when used as an interacted compound with cyclodextrin.

The fact that the number of dead houseflies in case (d) is smaller than in case (d) at the initial stage is considered due to the fact that the concentration of the interacted compound was diluted as a result of dilution with sugar. Similar results were observed when an interacted compound of $\beta$-cyclodextrin with bioresmethrin, biotetramethrin, or furamethrin was used.

PEST CONTROL EXAMPLE 7

A stomach poison test was conducted on pine caterpillers using an interacted compound of bio-allethrin and $\beta$-cyclodextrin, and an interacted compound of bioresmethrin and $\beta$-cyclodextrin (in each case, the molar ratio of pyrethroid to $\beta$-cyclodextrin was 1:2).

In each test, eight 4th-instar larvae of pine caterpillars (body length 2 to 2.5 cm) were used. Six kinds of test were conducted. In each test, 40 pine leaves (8 - 10 cm long, about 2 g) were used either in the nontreated state or as treated with $\beta$-cyclodextrin, pyrethroid and the above interacted compounds respectively. The results (the number of dead pests) are shown in Table 10. In the Table, the figures in the parentheses show the percentage of the remaining pine leaves.

It is seen from the results obtained that both of bio-allethrin and bio-resmethrin have much the same stomach poison effect even when used as an interacted compound with $\beta$-cyclodextrin.

In all cases, the rate of dead insects is low at the initial stage when the interacted compounds of pyrethroids are used. But after a lapse of as long as 76 hour- Table 10

| | Amount of the pyrethroid attached to the leaves | 0.1% by weight | | | | | | | 0.02% by weight | | | | | | |
|---|---|---|---|---|---|---|---|---|---|---|---|---|---|---|---|
| | Time that elapsed | Minutes | | | | Hours | | | Minutes | | | | Hours | | |
| No. | Treating agent for pine tree leaves | 10 | 20 | 70 | 225 | 21 | 30 | 50 | 76 | 10 | 20 | 70 | 225 | 21 | 30 | 50 | 76 |
| 1 | Interacted compound of bio-allethrin with $\beta$-cyclodextrin | 2 | 4 | 7 | 6 | 7 | 7 | 7 | 8 (ca. 100) | 0 | 2 | 3 | 4 | 4 | 5 | 5 | 7 (ca. 90) |
| 2 | Interacted compound of bio-resmethrin with $\beta$-cyclodextrin | 0 | 0 | 0 | 0 | 5 | 6 | 8 | 8 (ca. 100) | 0 | 0 | 0 | 0 | 3 | 6 | 6 | 6 (ca. 90) |
| 3 | Bio-allethrin | | | | | | | | | 4 | 5 | 7 | 6 | 8 | 8 | 8 | 8 (ca. 90) |
| 4 | Bio-resmethrin | | | | | | | | | 6 | 6 | 6 | 6 | 8 | 8 | 8 | 8 (ca. 90) |
| 5 | The leaves not treated | 0 | 0 | 0 | 0 | 1 | 1 | 1 | 1 (ca. 30) | | | | | | | | |
| 6 | Cyclodextrin alone | 0 | 0 | 0 | 0 | 0 | 0 | 0 | 0 (ca. 25)(0) | | | | | | | | |

Table 10 — Continued

| No. | Treating agent for pine tree leaves | Amount of the pyrethroid attached to the leaves 0.004 % by weight | | | | | | | |
|---|---|---|---|---|---|---|---|---|---|
| | | Time that elapsed | | | | | | | |
| | | Minutes | | | | hours | | | |
| | | 10 | 20 | 70 | 225 | 21 | 30 | 50 | 76 |
| 1 | Interacted compound of bio-allethrin with $\beta$-cyclodextrin | 1 | 1 | 1 | 1 | 1 | 1 | 2 | 2 (co. 75) |
| 2 | Interacted compound of bio-resmethrin with $\beta$-cyclodextrin | 0 | 0 | 0 | 0 | 2 | 4 | 7 | 8 (ca. 80) |
| 3 | Bio-allethrin | | | | | | | | |
| 4 | Bio-resmethrin | | | | | | | | | s, there is heardly any difference in the rate of dead insects.

When using pine leaves to which a pyrethroid as an interacted compound of pyrethroid with $\beta$-cyclodextrin had been adhered, the pine caterpillars fell off from the pine leaves and were observed to be in agony on the floor, although not to death. Accordingly, the pine caterpillars which ate the pyrethroid first fell from the pine leaves, and gradually die, and in view of this, the amount of the pine leaves eaten is very small irrespective of the time duration required before death, and the damage can be minimized.

Since pyrethroids have poor stability to ultraviolet rays, even if they are used as a mixture with starch, etc. as shown in Table 1, they lose their effect. But when used as interacted compounds with cyclodextrins, the pyrethroids become very stable to ultraviolet rays, and are scarcely decomposed for a prolonged period of time. This is especially advantageous for outdoor application of the pesticidal composition of this invention, as in the case of controlling the pine catapillars. Furthermore, this demonstrates that pyrethroids can be very effectively utilized by using them as interacted compounds with cyclodextrins.

What we claim is:

1. An insecticidal and acaricidal composition comprising a pesticidal amount of an interacted compound of a pyrethroid with a cyclodextrin and a diluent or carrier.

2. The composition of claim 1 wherein the amount of the interacted compound is 0.5 to 100 percent by weight.

3. The composition of claim 1 wherein the amount of the pyrethroid in the interacted compound is 0.5 to 1.5 moles per mol of said cyclodextrin.

4. The composition of claim 1 wherein said cyclodextrin is a cyclodextrin consisting of 6 to 8 glucose molecule units.

5. A process for controlling pests which comprises applying a pesticidal amount of an interacted compound of a pyrethroid with a cyclodextrin to pests and/or their habitat.

* * * * *